(12) United States Patent
Orr et al.

(10) Patent No.: US 6,359,280 B1
(45) Date of Patent: Mar. 19, 2002

(54) DETECTORS

(75) Inventors: Christopher Henry Orr; Craig Janson Luff; Thomas Dockray, all of Calderbridge (GB); Duncan Whittemore Macarthur, Los Alamos, NM (US); John Alan Bounds, Los Alamos, NM (US); Krag Allander, Los Alamos, NM (US)

(73) Assignees: British Nuclear Fuels PLC, Cheshire (GB); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/307,370

(22) Filed: May 7, 1999

(30) Foreign Application Priority Data

May 8, 1998 (GB) .............................. 9809747
May 8, 1998 (GB) .............................. 9809754

(51) Int. Cl.[7] ................................ G01T 1/18
(52) U.S. Cl. .............................. 250/370.01; 250/370.09
(58) Field of Search ..................... 250/385.1, 370.01, 250/374, 376

(56) References Cited

U.S. PATENT DOCUMENTS

| 4,788,430 A | * 11/1988 | Gonthier ..................... 250/376 |
| 4,814,608 A | 3/1989 | Dempsey et al. ............ 250/253 |
| 4,853,536 A | 8/1989 | Dempsey et al. ............ 250/253 |
| 4,970,391 A | * 11/1990 | Uber, III .................... 250/374 |
| 4,992,658 A | 2/1991 | Ramsey et al. ............. 250/253 |
| 5,008,540 A | 4/1991 | Dempsey ................. 250/336.1 |
| 5,055,674 A | 10/1991 | Kotrappa .................... 250/255 |
| 5,059,803 A | 10/1991 | Kronenberg ............. 250/385.1 |
| 5,107,108 A | 4/1992 | Ramsey et al. ............. 250/253 |
| 5,126,567 A | 6/1992 | Dempsey et al. ........ 250/336.1 |
| 5,128,540 A | 7/1992 | Stieff ......................... 250/255 |
| 5,184,019 A | 2/1993 | MacArthur et al. ......... 250/380 |
| 5,187,370 A | 2/1993 | MacArthur et al. ......... 250/379 |
| 5,194,737 A | 3/1993 | MacArthur et al. ......... 250/382 |
| 5,281,824 A | 1/1994 | MacArthur et al. ......... 250/380 |
| 5,311,025 A | 5/1994 | MacArthur et al. ......... 250/374 |
| 5,514,872 A | 5/1996 | Bolton et al. ............... 250/380 |
| 5,525,804 A | 6/1996 | MacArthur et al. ......... 250/374 |
| 5,550,381 A | 8/1996 | Bolton et al. ............... 250/380 |
| 5,663,567 A | 9/1997 | Steadman et al. .......... 250/382 |
| 5,679,958 A | 10/1997 | MacArthur ................. 250/382 |
| 5,877,502 A | 3/1999 | Koster et al. ............... 250/382 |

FOREIGN PATENT DOCUMENTS

WO    WO 98/38531    9/1998 .................... 1/185

* cited by examiner

Primary Examiner—Constantine Hannaher
Assistant Examiner—Otilia Gabor
(74) Attorney, Agent, or Firm—Workman, Nydegger & Seeley

(57) ABSTRACT

The apparatus and method provide techniques through which both alpha and beta emission determinations can be made simultaneously using a simple detector structure. The technique uses a beta detector covered in an electrically conducting material, the electrically conducting material discharging ions generated by alpha emissions, and as a consequence providing a measure of those alpha emissions. The technique also offers improved mountings for alpha detectors and other forms of detectors against vibration and the consequential effects vibration has on measurement accuracy.

20 Claims, 3 Drawing Sheets

DETECTORS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of CRADA No. LA96C10298 and Contract No. W-7405-ENG-36 awarded by the U.S. Department of Energy.

BACKGROUND OF THE INVENTION

1. Field of the Invention

This invention concerns improvements in and relating to detectors, particularly, but not exclusively, in relation to the detection of ions produced by alpha emissions and in conjunction with beta emission detection and/or the mounting of such detectors.

2. Present State of the Art

It is desirable to have as much information as possible about the location and type of emission sources encountered in a variety of applications, including decommissioning and waste management operations.

Separate instruments for alpha emissions and beta emissions are known. For instance, direct detection of alpha emissions can be achieved by the presentation of the detector in very close proximity with the source to be measured or ions produced by the passage of alpha particles can be detected by attracting them to detector plates. However, use of two separate instruments involves two separate, time consuming, analyses of an area and also introduces difficulties in tying the two sets of information together to give accurate positional resolution. Additionally, whilst it is desirable to apply such techniques to a wide variety of instrument forms, for instance instruments which are moved about during monitoring. Vibration, what ever its source, be it from movement of the instrument or due to the presence of motors etc, gives rise to substantial problems.

BRIEF SUMMARY AND OBJECTS OF THE INVENTION

The present invention aims to provide an instrument and detector type in which combined alpha and beta determination in a single simultaneous step is achieved, from corresponding locations, and without effecting detector efficiency in relation to either type of source. The present invention also aims to provide for the elimination or substantial reduction of vibration using mechanical means.

According to a first aspect of the invention we provide an instrument for monitoring alpha and beta sources, the instrument position determining a detecting location, the instrument comprising one or more detector elements, at least one of the detector elements providing an electrically conducting exterior portion and beta detector means provided behind that portion relative to the detecting location, the electrically conducting layer being provided with an electrical potential, means being provided to monitor ions discharged on the element.

In this way a single detector can monitor ions produced by alpha particles and also directly monitor beta particles entering the beta detector means.

The instrument may be used to monitor discrete items or areas. Discrete items are typified by tools, pipes, pumps, filters and the like. Areas are typified by locations or surfaces, such as floors, walls, ceilings, soil, rubble, material on a conveyor, and include surfaces of pieces of equipment such as glove boxes, tanks, vessels and the like.

The item or area may be presented to the detecting location by moving the item or area to the location and/or by moving the instrument to the item or location. Movement of the item or area will be prefer for small items and conveyed material. Movement of the instrument may be preferred for surveying surface areas, for instance soil, or for monitoring large items which cannot readily be moved.

The detection location may be provided within a continuous enclosure formed by the instrument, for instance a sealable box. The detecting location may be provided within an open enclosure and/or at or in proximity to an opening in the enclosure, for instance in proximity to a hood.

The element(s) may be planar. The element(s) may be non-planar.

Two or more elements may be provided. The elements may be provided in opposition to one another, for instance with the detecting location between them.

The alpha detecting means are preferably provided by the electrically conducting portion. Detection is preferably indirectly made through detection of ions.

Preferably the electrically conducting portion is of metal. Aluminium represents a preferred metal for the portion.

The conducting portion preferably extends at least across the part of the element facing the detecting location. It is preferred that the conducting portion extends around the beta detection means.

The conducting portion may be provided with a greater thickness for portions not opposing the detecting location, particularly those portions facing away from the detecting location. The back face of a planar element may, therefore, be provided with a thicker layer of conductor, for instance greater than 1 mm.

The conducting portion may be provided with a thickness, opposing the detecting location, at least in part, of less than 100 $\mu$m, preferably less than 50 $\mu$ and ideally less than 10 $\mu$m.

The beta detecting means may comprise a scintillator. The scintillator may be formed of a plastic scintillating material in conjunction with a photodetector, for instance a photomultiplier. Preferably the scintillator material is light sealed relative to the outside of the scintillator. The sealing may be provided in part, or completely, by the electrically conducting material.

The beta detector means may comprise a detector in which the presence of beta particles generates ions, for instance a gas flow proportional counter. The detector means may be provided, completely or in part, with a metallic exterior by the electrically conducting portion.

The electrical signal generated by the alpha detector means is preferably conveyed to monitoring means by an electrical conductor. The monitoring means may comprise an electrometer.

Preferably the electrical potential is applied from an external potential source. The electrical potential may be electrostatically provided.

Where only one element is provided an electrical potential is preferably applied to that element.

Where more than one element is provided some or all of those elements may have, or have applied, a potential. The potentials may be different. Some of the elements may be grounded, with some having a potential. Preferably the different potentials are configured to generate an electric field between adjoining elements. Preferably in such a case the detection location is provided between the elements.

The ion discharge monitoring means may comprise an electrostatic potential determination. Preferably the means comprise current indicating means.

The current indicating means preferably includes current measuring means, for instance an electrometer, such as a ground referenced electrometer.

Where only one element is provided the current indicating means is connected to that element.

Where two or more elements are provided the current indicating means may be connected to one or more of those elements. Preferably elements of the same applied potential are connected to the current indicating means.

The element may be provided with a further electrically conducting portion, electrically insulated relative to the first and provided on a side facing away from the detecting location. The further conducting portion is preferably at an equivalent level of applied potential to the first. Preferably current indicating, and most preferably current measuring means are connected to the further conducting portion.

The further electrically conducting portion is preferably in contact with a gas volume in contact with the gas of the detecting location. Preferably the gas contacting the further electrically conducting portion is separated from the gas volume in contact with the detecting location by an ion and/or particulate impermeable barrier.

Preferably a further beta detection means is provided between the further electrically conducting portion and the first beta detection means. Preferably the two beta detection means are separated by a beta screen.

According to a second aspect of the invention we provide a detector element for monitoring alpha and beta sources, the element comprising an electrically conducting exterior portion for receiving ions generated by alpha particles and beta detector means provided behind the electrically conducting portion relative to the source(s).

The element(s) may be planar. The element(s) may be non-planar. Cylindrical element(s) may for instance be provided.

Preferably the electrically conducting portion is of metal. Aluminium represents a preferred metal for the portion.

The conducting portion preferably extends at least across part of one side of the element. It is preferred that the conducting portion extends around the beta detection means.

The conducting portion may be provided with a greater thickness for portions on one or more sides than for portions on one or more other sides. One side may have a lower thickness than the opposing side and the adjoining sides. The thicker layer of conductor may be greater than 1 mm.

The beta detecting means may comprise a scintillator. The scintillator may be formed of a plastic scintillating material in conjunction with a photodetector, for instance a photomultiplier. Preferably the scintillator material is light sealed relative to the outside of the scintillator. The sealing may be provided in part, or completely, by the electrically conducting material.

The beta detector means may comprise a detector in which the presence of beta particles generates ions, for instance a gas flow proportional counter. The detector means may be provided, completely or in part, with a metallic exterior by the electrically conducting portion.

The electrical signal generated by the alpha detector means is preferably conveyed to monitoring means by an electrical conductor.

The element may be provided with a further electrically conducting portion, insulated relative to the first, and provided on a side facing away from the first. Preferably a further beta detection means is provided between the further electrically conducting portion and first beta detection means. Preferably the two beta detection means are separated by a beta screen. Background alpha and beta determinations may be made in this way.

According to a third aspect of the invention we provide a method of monitoring alpha and beta sources, the method comprising the steps of placing a location to be monitored in proximity with an instrument, and/or placing an instrument in proximity with a location to be monitored, the instrument being provided according to the first aspect of the invention, the instrument providing a signal indicative of alpha sources and a signal indicative of beta sources.

The third aspect of the invention should be taken to include steps and stages necessary to implement the features set out elsewhere in this document, including those features, options and possibilities themselves.

According to a fourth aspect of the invention we provide an instrument for detecting ions originating from a monitored location, the instrument having a body portion defining a detecting location, the instrument comprising one or more electrically conducting detector elements, the element(s) having an electrical potential relative to the monitored location, at least a part of the one or more electrically conducting element(s) opposing the detecting location and one or more of the elements being mounted on an electrically insulating material to insulate it relative to the body portion, the element(s) being in contact with the mounting over at least 10% of the surface area of the element facing away from the detecting location and further comprising means for monitoring ions discharged on one or more of the elements.

The contact area may comprise at least 25%, more preferably at least 50% and ideally at least 75% of the area of the element facing away from the detecting location. Preferably the element is in contact with the mounting over all, or substantially all, of the side facing away from the detecting location.

The instrument may be used to monitor discrete items or locations. Discrete items are typified by tools, pipes, pumps, filters, cables, rods and the like. Locations are typified by surfaces, such as floors, walls, ceilings, soil, rubble, material on a conveyor, and include surfaces or parts thereof on pieces of equipment such as glove boxes, tanks, vessels and the like.

The item or location may be introduced to the detecting location by moving the item or location to the location and/or by moving the instrument to the item or location. Movement of the item or location will be preferred for small items and conveyed material. Movement of the instrument may be preferred for surveying surface areas, for instance soil, or for monitoring large items which cannot readily be moved.

The instrument may provide the detecting location within a continuous enclosure, for instance a sealable box. The instrument may provide the detecting location within an open enclosure, for instance in proximity to a hood.

Ions generated by the item and/or location may be moved to the detecting location, for instance by air flow, from a monitored location.

The element(s) may be planar. The element(s) may be non-planar.

The mounting may be planar. The mounting may be non-planar.

Preferably the insulating mounting is provided in a configuration matching the portion of the element to which it is to be attached. A planar element and planar mounting are preferred.

The mounting may be attached to the instrument around one or more, and preferably two or more, edges.

The mounting may be attached to the instrument on one side, preferably the side facing away from the detecting location.

The contact between the mounting and the instrument may be provided over at least 10% of the surface area of the mounting. The contact may be at least 10% of the surface area of the side of the mounting facing away from the detecting location. The contact area may comprise at least 25%, more preferably at least 50% and ideally at least 75% of the area of the mounting facing away from the detecting location. Preferably the mounting is in contact with the instrument over all, or substantially all, of the side facing away from the detecting location.

Two or more elements may be provided. The elements may be provided in opposition to one another. Preferably in such cases the detecting location is provided between the elements.

Preferably the electrically conducting element is of metal. Aluminium represents a preferred metal.

Preferably the electrical potential is applied from an external potential source. The electrical potential may be provided electrostatically.

Where only one element is provided an electrical potential is preferably applied to that element.

Where more than one element is provided some or all of those elements may have, or have applied, a potential. The potentials may be different. Some of the elements may be grounded, with some having a potential. Preferably the different potentials are configured to generate an electric field between adjoining elements, and most preferably with the detecting location with the electric field.

The current indicating means preferably includes current measuring means, for instance an electrometer.

Where only one element is provided the current indicating means is connected to that element.

Where two or more elements are provided the current indicating means may be connected to one or more of those elements. Preferably elements of the same applied potential are connected to the current indicating means.

The mounting may include leakage current protection/guard. The protection/guard may comprise an electrical conductor isolated electrically from the detector element(s) by part of the insulating mounting, the further electrical conductor being provided between the detector element(s) and the mounting on the instrument body. Preferably the further conductor is also electrically insulated from the instrument body by a further electrical insulating component provided between the further conductor and the mounting on the body. The contact between the further conductor and insulating mounting for the detector element(s) and/or the contact between the further conductor and the further electrical insulating component may also be provided according to the invention in terms of the contact area.

The element may be provided with a further electrically conducting detector element, insulated relative to the first and relative to the body, and provided on a side facing away from the detecting location. The further portion is preferably at an equivalent applied potential level to the first. Preferably current indicating, and most preferably current measuring means are connected to the further portion.

The further detector element may also be provided with leakage protection a guard plate as described above.

In a preferred structure a detector element facing the detecting location is provided, with a further detector element mounted indirectly thereon facing away from the detecting location, the indirect mounting be provided by the electrical insulated mounting and comprising a first electrical insulator mounted on the detector element, an intervening element mounted on the first insulator, a second insulator mounted on the intervening element, the second insulator mounting the further detector element. Preferably this structure is mounted on the instrument body via the intervening element. Preferably the intervening element is electrically conducting.

According to a fifth aspect of the invention we provide a method of detecting ions generated by one or more alpha sources, in which an instrument is provided in proximity with a location receiving ions generated by an item and/or location which may or may not have an alpha source and monitoring the level of ions detected, the instrument being provided according to the first aspect of the invention.

The method may include moving the instrument between monitoring different items and/or locations.

The fifth aspect of the invention should be taken to include steps, stages and operations necessary to implement the features, options and possibilities set out elsewhere in this document.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENT

The monitoring of alpha and/or beta and/or gamma emissions from an item or location is of particular significance during decommissioning, material accounting and a variety of other applications. An accurate calculation of the level of contamination present enables the correct decision to be taken in classifying an item or a location in terms of its grade or the most suitable decontamination process. The locations intended to be monitored include a variety of surfaces, such as floors, walls, ceilings, soil, rubble, open ground, equipment surfaces and the like, including materials on conveyors. Items include tools, pipes, pumps, filters, cables, rods and the like.

The detection of alpha particles emitted into air from an item is possible through indirect means. Despite the fact that alpha particles only travel a few centimetres in air, and as a consequence cannot be detected directly at any significant distance from their source, during the course of their travel through the air they cause ionisation of a significant number of air molecules. As these ionised molecules remain in that state for a sufficient period of time they can be detected remote from the alpha source.

Figure 1:
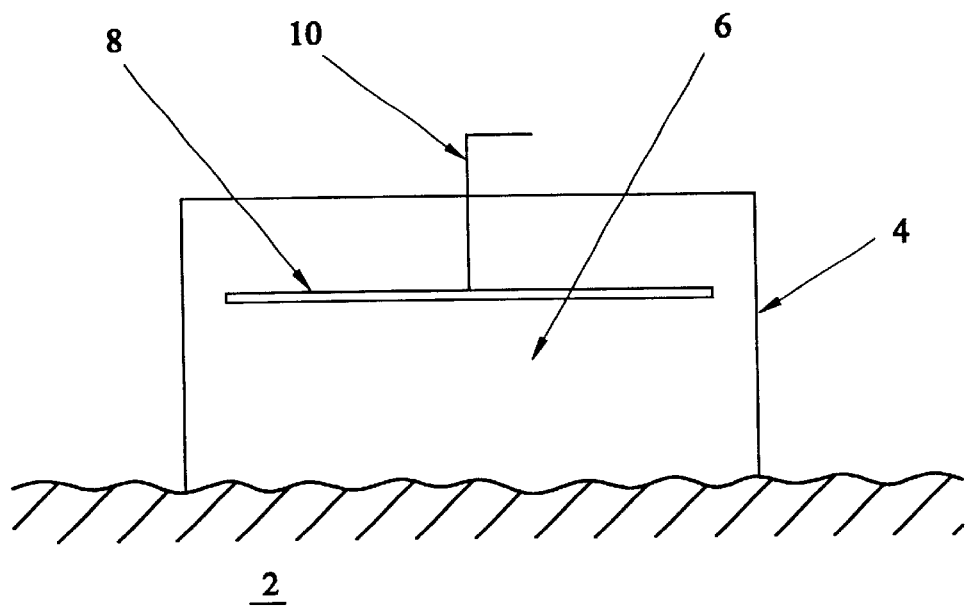
FIG. 1 illustrates a prior art alpha particle monitoring instrument.

Alpha detection based on this principle is possible using an instrument of the type illustrated in FIG. 1. Here an area of surface 2 to be monitored is enclosed within a container 4 so as to define a measuring chamber 6. The container 4 is provided with a plate of electrically conducting material 8 which is connected via lead 10 to a remote monitoring location. The conducting material 8 may be mounted on the container 4 by a series of insulating elements 9, the remainder of the gaps 11 between the detector 8 and the top of the container 4 being open space. By applying an electrical potential to the plate 8 ions of one polarity present within the volume 6 are attracted to the plate 8 and these can be detected by an electrometer. The current level is indicative of the level of ions and hence level of alpha emissions occurring within the volume 6.

The ions can be electrostatically attracted to the plate or their passage into proximity with the plate can be assisted by generating an airflow in the instrument from the source towards the detector.

It is useful, whenever possible, to have as much information as can be derived about non-alpha sources within the location and/or on an item being monitored. Thus in a variety of applications information on beta emission too is desirable. The locations under consideration include a variety of surfaces including floors, walls, ceilings, surfaces of articles, soil, material on conveyor systems and the like. The items under consideration include pipes, rods, cables, tools, small pieces of equipment and the like. Locations/items may be introduced to the instrument for monitoring and/or have the instrument provided around them in-situ.

In the prior art it is known to survey an area or item using an alpha detection instrument and then monitor it using a separate beta detection instrument. This process is both time consuming, as two separate analyses are required, and also inaccurate as the position of the alpha analysis and beta analysis require careful linking if accurate information about any location within the environment is to be obtained.

The present invention proposes a revised detector plate arrangement whereby alpha and beta detection can simultaneously be achieved.

Figure 2:
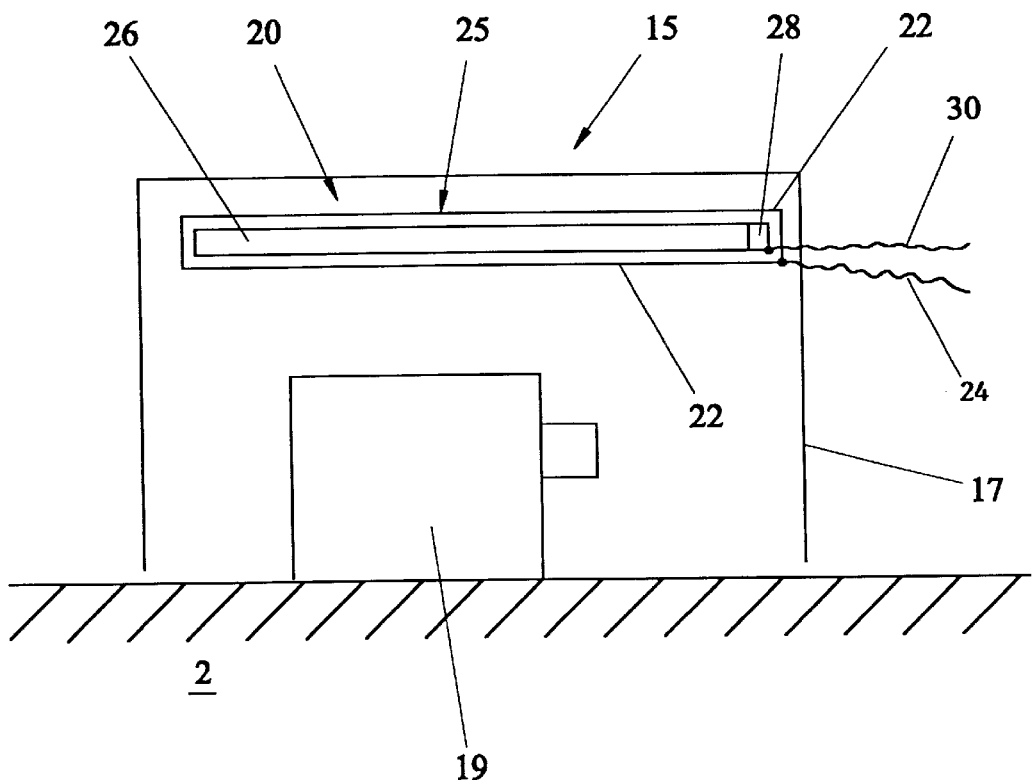
FIG. 2 illustrates an instrument incorporating a detection plate according to a first embodiment of the present invention.

As illustrated in FIG. 2 the instrument 15 comprises a container 17 which is placed over an item 19 to be monitored. The ordinary electrically conducting plate of the prior art is, however, replaced with a composite plate 20. The plate 20 comprises an external layer 22 of electrically conducting material which is connected by a lead 24 to an electrometer and electrical potential in use. The external layer is thicker on its rear surface 25 so as to eliminate as far as possible the number of background beta detections ie thickness greater than 1 mm. The layer on the rear surface 25 may be provided by the top of the container 17 and/or a component attached thereto. In such a case, the rear face is virtually separated from the front surface 22 to which the ions are attracted, The front surface 22 is provided at a thickness transparent to beta's, ie less than 20 μm.

The electrically conducting exterior of the plate 20 allows an electric potential to be generated between this plate 20 and the grounded item 19. Ions are thereby attracted to the plate 20 and give rise to a detectable current.

Under the electrically conducting layer 22, however, the plate 20 includes a beta detecting layer 26. As illustrated, this layer 26 consists of a plastic scintillator which on entry of a beta particle into it scintillates The beta detection layer 26 also includes a photomultiplier 28 which converts the light generated into an electrical signal which leaves the plate 20 via connection 30 to associated instrumentation, not shown.

Other forms of beta detector such as gas flow proportional counters could be employed to directly replace the scintillator of the above described embodiment. Gas flow proportional counters rely on beta particles entering a sealed metallic chamber through a metallic window, the chamber containing a detector gas which is ionised by the particles. The ions are accelerated and multiplied by an electric field and detected as an electronic pulse.

The plates according to the invention allow combined alpha and beta determinations in a simultaneous manner without compromising the detection efficiency of either. The position of the instrument is equivalent for each detection so avoiding errors when comparing the two detections. Significant advantages over separate monitoring are therefore achieved.

Provision of alpha and beta detection at the same location simultaneously is also advantageous in preventing errors due to the essentially random nature of emission events.

The provision of the detector plates by applying a layer of aluminium foil to a plastic scintillator offers significant advantages in terms of cost of construction.

Whilst the embodiment illustrated in FIG. 2 consists of a planar electrode a variety of other detector electrode configurations are possible.

Figure 3:
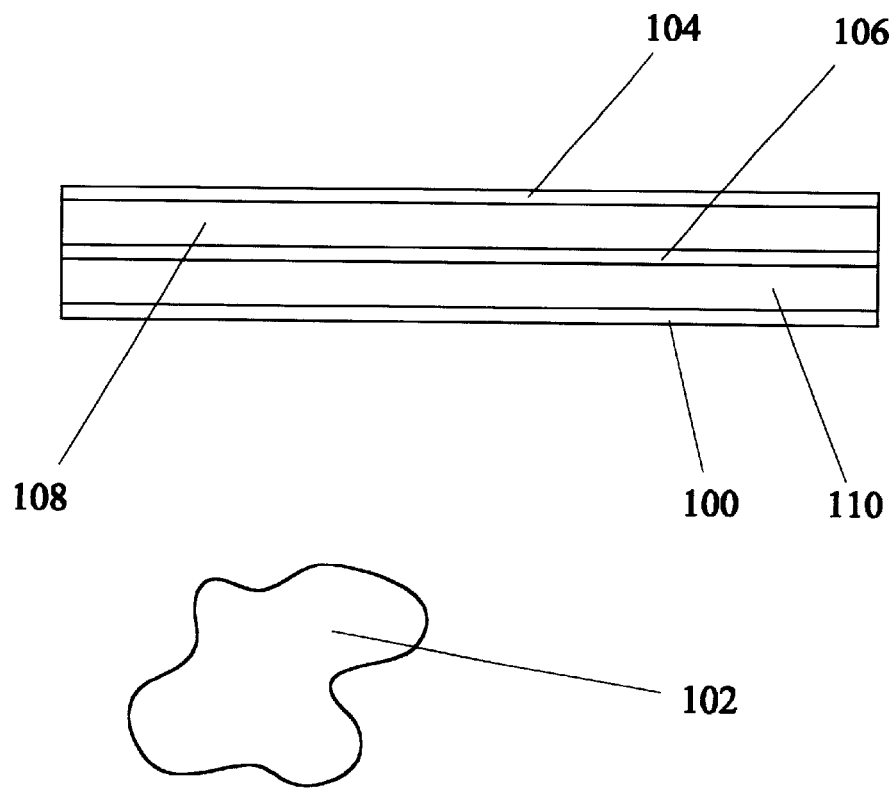
FIG. 3 illustrates a background cancelling embodiment of the present invention.

In the further embodiment of the invention, FIG. 3, the electrodes may be provided in a background cancelling manner for the alpha signal. Here an alpha detecting electrode 100 is provided to monitor a source 102. The electrode 100 also picks up background generated ions too, but this can be accounted for by monitoring the signal arising from the background detector plate 104.

A guard plate 106 and two layers of material 108, 110 are provided between the guard plate 106 and the item 100 and background electrode 104. Both of these layers 108, 110, may, however, be provided beta detecting scintillators. Dual detection is therefore achieved.

If the guard plate 106 is sufficiently thick to shield against beta emissions then background cancelling for that signal too can be provided.

To provide gamma information aswell, the detector array may also be provided with a gamma detector in a fixed position relative to it. The gamma detector may be of the thick plastic scintillator type, sodium iodide crystal type or semiconductor type. The detector may be collimated and/or otherwise shielded to provide directional information.

The embodiments described in FIGS. 2 and 3 also offer significant advantages in terms of the rigidity of the detector plate mounting. Prior art instruments and a variety of other instruments based around this detection principal, suffer problems where vibration of the detector array occurs. The instrument and/or location may be moved relative to one another causing vibration and/or other equipment, such as fan motors, may cause vibration. The problem is the same in each case, what ever the source of the vibration.

Whenever a location, in a grounded state, moves relative to the detector array, at an applied potential, vibration in the detector plates is likely and capacitance changes occur as a result which effect the instruments detection capabilities through the generation of high noise levels. The problem is particularly acute for detectors in which ions are attracted to a detector plate at an elevated potential relative to the grounded item/location under analysis, so called electrostatic systems; or where the instruments are employed with moving locations/items; or where the instruments are moved across locations.

The capacitance changes result in a noise current, whose value is determined by the expression $$I \equiv \frac{dQ}{dt} = V\frac{dC}{dt} \text{ (where } V \text{ is constant)}$$

Since the capacitance of the detector is directly related to the distance from the electrode in the detector to the grounded object, variations in the distance, for instance through vibrations, cause a directly proportional noise current.

Typical detection currents for the alpha particle generated ions are in the order of $10^{-12}$A for an item which is suitable for unrestricted release. As distance variation induced currents can readily reach several nA ($10^{-9}$A) noise control is important if the desired signal is not to be obscured.

This problem is addressed to a significant extent by the embodiment of the invention illustrated in FIG. 2 as the plate is provided on a substantial structural component, the scintillator 26. As a consequence, the degree of variation due to vibration is significantly reduced. The embodiment of the invention illustrated in FIG. 3 still further reduces this vibration by providing the sandwich structure incorporating the guard plate 106.

Additional ways of addressing this issue, with or without the use of beta and/or gamma detectors and scintillators in particular are now provided.

Figure 4:
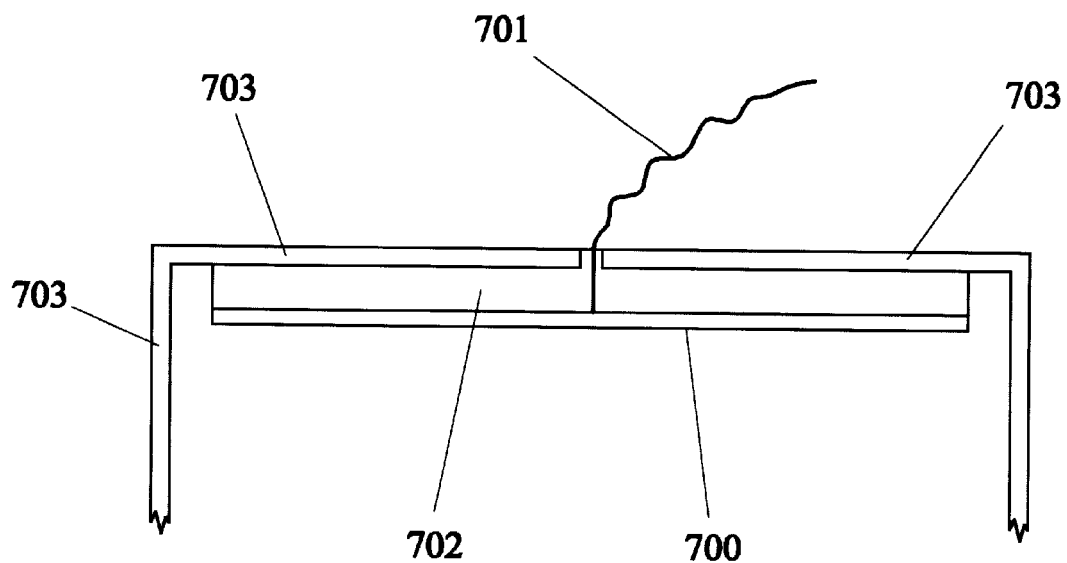
FIG. 4 illustrates an instrument according to a further embodiment of the present invention.

In the embodiment of the invention illustrated in FIG. 4 the detector array is provided in terms of a detector plate 700 to which a potential is applied via lead 701. The system is also applicable to arrangements in which an electric field is generated between a plate and another plate. As previously, current arising from detected ions is monitored using an electrometer.

Unlike prior art systems, where hanging point mountings for the thin detector plates are employed, this embodiment provides the detector plate 700 in a composite construction with an electrically insulating material 702. Contact between the two over a substantial area provides a firm bond between the two. The combined thickness and structural properties of the composite allow more substantial and rigid fixing to the supporting structure to be used, in this example to the instruments top wall 703.

The combined structural properties also significantly reduce any flex in the electrode where it is mounted on edge supports.

As well as offering advantages in terms of reduced noise and vibration, the composite is also simpler to manufacture that prior art detectors.

Figure 5:
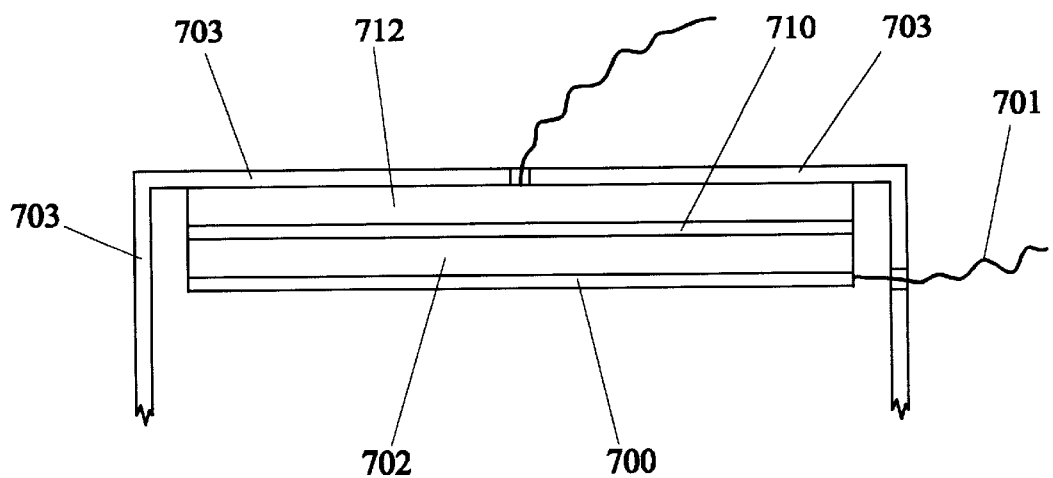
FIG. 5 illustrates a still further embodiment of the present invention.

A further embodiment of the invention, intended to reduce leakage currents, is illustrated in FIG. 5 where the structure of FIG. 4 is supplemented with a further plate 710 and further layer 712 of insulating material. The layer 712 is mounted on the top wall 703 defining part of the instrument so as to give a rigid structure.

Figure 6:
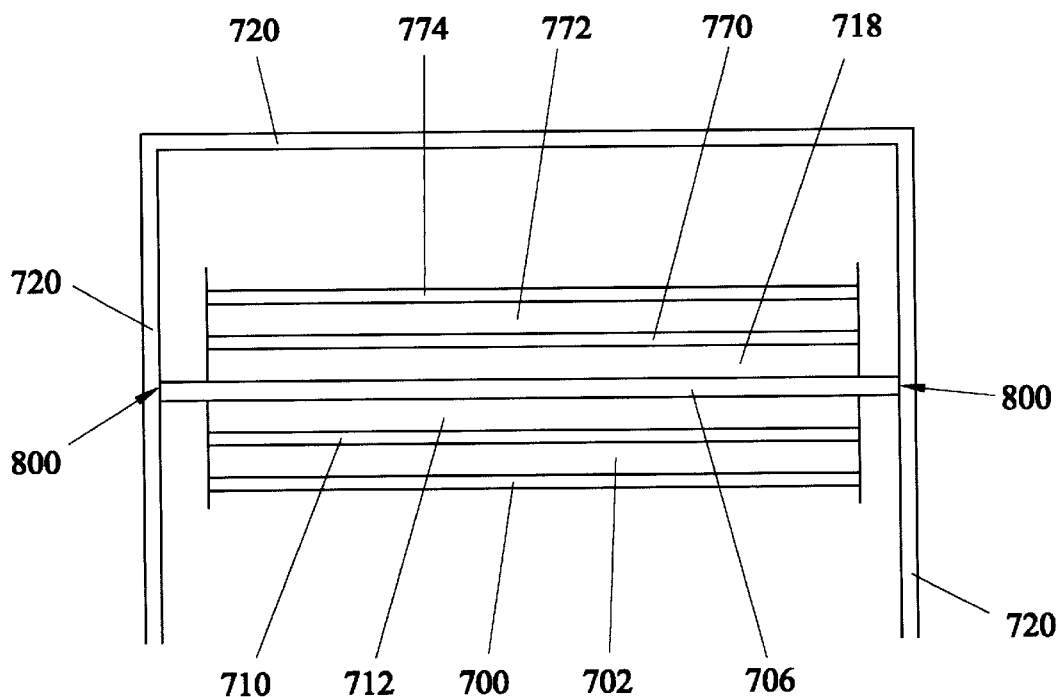
FIG. 6 illustrates a still further embodiment of the present invention.

The still further embodiment of the invention illustrated in FIG. 6 provides a background cancelling detector array The detector electrode 700 which is exposed to the alpha particle generated ions is once again mounted on an insulating layer 702, itself mounted on a plate 710 and insulating layer 712. A guard plate 706 is fixed to the back of the insulating material 712. A further layer of electrically insulating material 718 is mounted on the guard plate 706 and carries a further plate 770 on its rear. The plate 770 is provided with an insulating layer 772, which carries a further plate 774.

The guard plate 706 extends laterally to a sufficient extent to provide a mounting 800 for the entire assembly on the container side walls 720. The guard plate 706 is relatively thick, 0.5 cm or so, to give still further rigidity to the assembly.

The plate 774 on the rear of the further layer of insulator 772 is provided together with the plate 770 for the detection of background ions.

An electric potential is applied to each of the plates 700, 774 in use and the current is monitored through a connection to an electrometer for each plate, not shown. A current reading for each detector plate 700, 774 is obtained as a result. The background can be subtracted from the item+ background value to give an absolute item value using software.

The embodiments of the invention described above address alpha particle determinations but it is perfectly possible to incorporate gamma and/or beta detectors in such an instrument alternatively or additionally. The gamma detectors may be of the plastic scintillator type, sodium iodide crystal type or semi-conductor type. Beta detection can be undertaken directly or alternatively by calculation from the gamma emissions recorded.

What is claimed is:

1. An instrument for monitoring alpha and beta sources, the instrument comprising:
   a detector element adapted to be positioned relative to an item or location that has alpha and beta emitting sources, the item or location being positioned at a monitoring location when the item or location is positioned relative to the detector element, the detector element comprising:
      a first beta detector having a front face adapted for facing towards the monitoring location and a back face adapted for facing away from the monitoring location; and
      a first electrically conducting portion disposed over at least a portion of the front face of the first beta detector such that the first electrically conducting portion is positioned between the first beta detector and the monitoring location, the first electrically conducting portion being electrically connected to a source of electrical potential; and
      means for monitoring ions discharged on the detector element.

2. An instrument according to claim 1 in which the first electrically conducting portion covers the entire front face of the first beta detector.

3. An instrument according to claim 1 wherein the first electrically conducting portion covers at least a portion of the back face of the first beta detector, the first electrically conducting surface on the back face of the first beta detector having a thickness greater than a thickness of the first electrically conducting portion on the front face of the first beta detector.

4. An instrument according to claim 3 wherein at least a portion of the first electrically conducting portion on the front face of the fist beta detector has a thickness less than $50\mu$ and at least a portion of the first electrically conducting portion on the back face of the first beta detector has a thickness greater than 1 mm.

5. An instrument according to claim 1 in which the first beta detector comprises a scintillator.

6. An instrument according to claim 1 wherein the first beta detector generates ions in the presence of beta particles.

7. An instrument according to claim 1 further comprising a second electrically conduction portion positioned so as to face the back face of the first beta detector, the second electrically conduction portion being electrically insulated from the first electrically conducting portion, the second electrically conducting portion being in contact with a gas volume that is in contact with a gas about the detecting location when the detector element is positioned relative to the item or location.

8. An instrument according to claim 7 in which the gas contacting the further electrically conducting portion is separated from the gas volume in contact with the detecting location by an ion and/or particulate impermeable barrier.

9. An instrument according to claim 7 further comprising:
   a second beta detector provided between the second electrically conducting portion and the first beta detector; and
   a beta screen positioned between the first beta detector and the second beta detector.

10. An instrument according to claim 1 further comprising a housing bounding a chamber, the detector element being disposed within the chamber.

11. An instrument according to claim 10, wherein the housing comprises a hood having an opening so that the hood can be selectively placed over the item or location.

12. An instrument according to claim 10 wherein the chamber is entirely enclosed by the housing.

13. An instrument according to claim 1 wherein the detector element comprises one or more detector elements.

14. A method of monitoring alpha and beta sources, the method comprising:
   positioning a detector element and an item or location that has alpha and beta emitting sources in relative proximity to one another, the detector element comprising:
      a first beta detector having a front face facing towards the item or location and a back face facing away from the monitoring location; and
      a first electrically conducting portion disposed over at least a portion of the front face of the first beta detector such that the first electrically conducting portion is positioned between the first beta detector and the item or location;
   applying an electrical potential to the first electrically conducting portion; and
   monitoring from the detector element a signal indicative of alpha sources and a signal indicative of beta sources.

15. A method accordingly to claim 14 wherein the act of positioning the detector element comprises positioning the item or location with in a chamber of a housing, the detector element being disposed within the chamber.

16. An instrument for detecting ions originating from a monitored location, the instrument comprising:
   a body portion defining a detecting location;
   an electrically conducting detector element being electrically coupled to a source of electrical potential, the detector element having a front face facing the detecting location and a back face facing away from the detecting location;
   an electrically insulating mounting secured on the back face of the detector element, the mounting covering at least 10% of the surface area of the back face of the detector element; and
   means for monitoring ions discharged on the detector element.

17. An instrument according to claim 16 in which the mounting covers at least 75% of the surface area of the back face of the detector element.

18. An instrument according to claim 16 in which the mounting includes leakage current protection/guard, the protection/guard comprising an electrical conductor isolated electrically from the detector element by part of the insulating mounting, the electrical conductor being provided between the detector element and the mounting on the instrument body.

19. An instrument according to claim 16 in which the detector element is provided with a further electrically conducting detector element, insulated relative to the first and relative to the body, and provided on a side facing away from the detecting location.

20. An instrument according to claim 16 in which a detector element facing the detecting location is provided, with a further detector element mounted indirectly thereon facing away from the detecting location, the indirect mounting be provided by the electrical insulated mounting and comprising a first electrical insulator mounted on the detector element, an intervening element mounted on the first insulator, a second insulator mounted on the intervening element, the second insulator mounting the further detector element.

* * * * *

UNITED STATES PATENT AND TRADEMARK OFFICE
CERTIFICATE OF CORRECTION

PATENT NO. : 6,359,280 B1  
DATED : March 19, 2002  
INVENTOR(S) : Christopher Henry Orr et al.

It is certified that error appears in the above-identified patent and that said Letters Patent is hereby corrected as shown below:

Column 2,  
Line 7, change "prefer" to -- preferred --  
Line 40, change "50 μ" to -- 50 μm --

Column 5,  
Line 43, change "provided" to -- provided, --

Column 6,  
Line 6, after "mounting" change "be" to -- being --  
Line 66, after "few" change "centimetres" to -- centimeters --

Column 7,  
Line 55, change "ie" to -- ,i.e., --  
Line 60, change "attracted," to -- attracted. --  
Line 61, change "beta's," to -- betas, --  
Line 61, change "ie" to -- i.e., --

Column 8,  
Line 30, change "electrode" to -- electrode, --  
Line 48, change "aswell" to -- as well --

Column 9,  
Line 57, before "prior" change "that" to -- than --

Column 11,  
Lines 8 and 10, change "conduction" to -- conducting --

Signed and Sealed this

Fourth Day of March, 2003

JAMES E. ROGAN  
*Director of the United States Patent and Trademark Office*